United States Patent
Merritt et al.

(10) Patent No.: US 11,994,141 B2
(45) Date of Patent: May 28, 2024

(54) TURBOMACHINERY SHAFT WITH VARIABLE LATTICE DENSITIES

(71) Applicant: Hamilton Sundstrand Corporation, Charlotte, NC (US)

(72) Inventors: Brent J. Merritt, Southwick, MA (US); Darryl A. Colson, West Suffield, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 122 days.

(21) Appl. No.: 17/472,184

(22) Filed: Sep. 10, 2021

(65) Prior Publication Data
US 2023/0085189 A1     Mar. 16, 2023

(51) Int. Cl.
| | |
|---|---|
| *F04D 29/053* | (2006.01) |
| *F04D 17/10* | (2006.01) |
| *F04D 29/051* | (2006.01) |
| *F16C 3/02* | (2006.01) |

(52) U.S. Cl.
CPC .......... *F04D 29/053* (2013.01); *F04D 17/10* (2013.01); *F04D 29/051* (2013.01); *F16C 3/02* (2013.01)

(58) Field of Classification Search
CPC ...... F04D 29/053; F04D 29/051; F04D 17/10; F01D 5/026; F16C 3/02; F16C 2360/43; F05D 2230/31; Y02T 50/50
See application file for complete search history.

(56) References Cited

U.S. PATENT DOCUMENTS

| | | | |
|---|---|---|---|
| 4,152,092 A | | 5/1979 | Swearingen |
| 4,459,802 A | | 7/1984 | Mowill |
| 4,820,128 A | * | 4/1989 | Ito .......................... C04B 35/634 |
| | | | 156/89.27 |
| 4,834,693 A | * | 5/1989 | Profant ..................... F16C 3/02 |
| | | | 428/614 |
| 5,224,842 A | | 7/1993 | Dziorny et al. |
| 5,921,683 A | * | 7/1999 | Merritt .................. F16C 27/063 |
| | | | 384/106 |

(Continued)

FOREIGN PATENT DOCUMENTS

| | | | | |
|---|---|---|---|---|
| DE | 202013010209 U1 | * | 3/2015 | ........... F04D 19/042 |
| EP | 2312171 A2 | * | 4/2011 | ................ F16C 3/02 |

(Continued)

OTHER PUBLICATIONS

Dong et al. Design and optimization of solid lattice hybrid structures fabricated by additive manufacturing, Elsevier Additive Manufacturing 33 (2020) 1011116, 1-12 (Year: 2020).*

(Continued)

*Primary Examiner* — David E Sosnowski
*Assistant Examiner* — Wayne A Lambert
(74) *Attorney, Agent, or Firm* — Kinney & Lange, P.A.

(57) ABSTRACT

A rotating shaft for a rotary machine includes a first shaft portion centered on a central axis and a variable lattice structure in an interior of the rotating shaft. The variable lattice structure includes a first region of the rotating shaft having a first lattice structure and a second region of the rotating shaft having a second lattice structure. The second lattice structure of the second region is denser than the first lattice structure of the first region. The second region is a deflection region or a stress region of the rotating shaft.

18 Claims, 6 Drawing Sheets

(56) References Cited

U.S. PATENT DOCUMENTS

| | | | |
|---|---|---|---|
| 7,766,603 | B2 | 8/2010 | Beckford et al. |
| 8,246,296 | B2 | 8/2012 | Smith |
| 8,777,561 | B2 | 7/2014 | Beers et al. |
| 9,181,959 | B2 | 11/2015 | Rosen et al. |
| 9,611,784 | B2 | 4/2017 | Beers et al. |
| 9,903,207 | B2 | 2/2018 | Tozzi et al. |
| 10,036,258 | B2 | 7/2018 | Mongillo et al. |
| 10,077,664 | B2 | 9/2018 | Clum et al. |
| 10,132,327 | B2 | 11/2018 | Beers et al. |
| 10,174,765 | B2 | 1/2019 | Colson et al. |
| 10,221,694 | B2 | 3/2019 | Snyder |
| 10,281,053 | B2 | 5/2019 | Griffin et al. |
| 10,557,464 | B2 | 2/2020 | Scancarello et al. |
| 10,633,976 | B2 | 4/2020 | Nissen et al. |
| 10,634,143 | B2 | 4/2020 | Scancarello et al. |
| 10,730,112 | B2 | 8/2020 | Welch |
| 10,774,653 | B2 | 9/2020 | Theertham |
| 10,830,249 | B2 | 11/2020 | Pulnikov |
| 10,982,672 | B2 | 4/2021 | Scancarello et al. |
| 11,015,482 | B2 | 5/2021 | Kasal et al. |
| 11,047,387 | B2 | 6/2021 | Wu et al. |
| 11,168,568 | B2 | 11/2021 | Theertham |
| 11,187,149 | B2 | 11/2021 | Kobielski et al. |
| 11,248,595 | B2 | 2/2022 | Scancarello et al. |
| 2003/0005705 | A1 | 1/2003 | Chan et al. |
| 2006/0062665 | A1* | 3/2006 | McAuliffe ............ F04D 29/462 415/191 |
| 2006/0104816 | A1 | 5/2006 | Kraemer et al. |
| 2010/0215506 | A1 | 8/2010 | Heyes et al. |
| 2012/0064815 | A1* | 3/2012 | Beers .................... F04D 29/057 454/71 |
| 2012/0156043 | A1* | 6/2012 | Colson .................. F04D 29/321 416/204 R |
| 2014/0026993 | A1 | 1/2014 | Rosen et al. |
| 2014/0030070 | A1 | 1/2014 | Beers et al. |
| 2014/0044531 | A1 | 2/2014 | Rosen et al. |
| 2014/0112774 | A1* | 4/2014 | Freeman ............... F04D 29/059 310/90.5 |
| 2014/0186161 | A1 | 7/2014 | Colson et al. |
| 2014/0301830 | A1 | 10/2014 | Beers et al. |
| 2015/0098805 | A1 | 4/2015 | Beers et al. |
| 2015/0285296 | A1* | 10/2015 | Simon .................. B21C 23/085 72/256 |
| 2015/0345396 | A1 | 12/2015 | Zelesky et al. |
| 2016/0001351 | A1* | 1/2016 | Gunther ................ B21K 1/063 72/283 |
| 2016/0177765 | A1 | 6/2016 | Lemoine et al. |
| 2016/0186589 | A1 | 6/2016 | Budnick et al. |
| 2016/0356167 | A1 | 12/2016 | Beers et al. |
| 2017/0002826 | A1 | 1/2017 | Byon |
| 2017/0009595 | A1 | 1/2017 | McCaffrey |
| 2017/0159447 | A1 | 6/2017 | Clum et al. |
| 2017/0182561 | A1 | 6/2017 | Scancarello et al. |
| 2017/0184086 | A1 | 6/2017 | Scancarello et al. |
| 2017/0184108 | A1 | 6/2017 | Scancarello et al. |
| 2017/0204873 | A1 | 7/2017 | Beers et al. |
| 2018/0038385 | A1 | 2/2018 | Welch |
| 2018/0209276 | A1 | 7/2018 | Tozzi et al. |
| 2019/0010827 | A1 | 1/2019 | Mohammed et al. |
| 2019/0024517 | A1 | 1/2019 | Takeda et al. |
| 2019/0032491 | A1 | 1/2019 | Nissen et al. |
| 2019/0070664 | A1 | 3/2019 | Paniogue et al. |
| 2019/0178085 | A1 | 6/2019 | Ripolles Perez |
| 2019/0178166 | A1 | 6/2019 | Miller et al. |
| 2019/0234313 | A1 | 8/2019 | Kray et al. |
| 2020/0040734 | A1 | 2/2020 | Cox |
| 2020/0141399 | A1 | 5/2020 | Scancarello et al. |
| 2020/0157968 | A1 | 5/2020 | Braun et al. |
| 2020/0165936 | A1 | 5/2020 | Kasal et al. |
| 2020/0182066 | A1 | 6/2020 | Theertham |
| 2020/0217206 | A1 | 7/2020 | Nissen et al. |
| 2020/0217321 | A1 | 7/2020 | Scancarello et al. |
| 2020/0269364 | A1 | 8/2020 | Beers et al. |
| 2020/0340488 | A1 | 10/2020 | Kobielski et al. |
| 2021/0003016 | A1 | 1/2021 | Theertham |
| 2021/0025325 | A1 | 1/2021 | Kobielski et al. |
| 2021/0025405 | A1 | 1/2021 | Kobielski et al. |
| 2021/0156304 | A1 | 5/2021 | Kobielski et al. |
| 2021/0222588 | A1 | 7/2021 | Kasal et al. |
| 2021/0396179 | A1 | 12/2021 | Balandier |
| 2022/0099110 | A1 | 3/2022 | Carr et al. |
| 2022/0275809 | A1 | 9/2022 | Kobielski et al. |
| 2022/0349416 | A1 | 11/2022 | Gaye et al. |

FOREIGN PATENT DOCUMENTS

| | | | | |
|---|---|---|---|---|
| EP | 3721093 | B1 | 8/2021 | |
| FR | 2958353 | A1 * | 10/2011 | ............... F16C 3/02 |
| JP | 2016037901 | A | 3/2016 | |
| JP | 2017112764 | A * | 6/2017 | ............... F16C 3/02 |
| JP | 2019138443 | A | 8/2019 | |
| JP | 2019138444 | A | 8/2019 | |
| JP | 2021057980 | A | 4/2021 | |
| NO | 134668 | B * | 8/1976 | |
| WO | 2019110909 | A1 | 6/2019 | |

OTHER PUBLICATIONS

Tang et al. Bidirectional Evolutionary Structural Optimization (BESO) based design method for lattice structure to be fabricated by additive manufacturing, Elsevier Computer-Aided Design 69 (2015) 91-101 (Year: 2015).*

Wang et al. Multi-scale design and optimization for solid-lattice hybrid structures and their application to aerospace vehicle components, Chinese Journal of Aeronautics, 92021), 34(5): 386-398 (Year: 2021).*

Zhang et al. Optimization design of variable density lattice structure for additive manufacturing, Elsevier Energy 242 (2022) 122554, 1-10 (Year: 2022).*

Extended European Search Report for European Patent Application No. 22194964.7, dated Jan. 30, 2023, 8 pages.

Extended European Search Report for European Patent Application No. 22193978.8, dated Jan. 30, 2023, 7 pages.

Extended European Search Report for European Patent Application No. 22195468.8, dated Feb. 10, 2023, 6 pages.

Extended European Search Report for European Patent Application No. 22194843.3, dated Feb. 2, 2023, 7 pages.

Extended European Search Report for European Patent Application No. 22194929.0, dated Jan. 23, 2023, 7 pages.

Aboulkhair, Nesma T., et al., "3D Printing of Aluminum alloys: Additive Manufacturing of Aluminum alloys using selective laser melting", Progress in Materials Science 106, 2019, 45 pages.

Fairclough, Caty, "Advancing Additive Manufacturing with Sequential Simulations", Mar. 7, 2018, 12 pages.

Stapleton, Thomas J., et al., "Additive Manufacturing Technology to Enhance Environmental Control Life Support (ECLS) Equipment Performance While Reducing Its Weight and Volume", 45th International Conference on Environmental Systems, Jul. 12-16, 2015, 7 pages.

* cited by examiner

TURBOMACHINERY SHAFT WITH VARIABLE LATTICE DENSITIES

BACKGROUND

The present disclosure relates to aircraft environmental control systems, and in particular, to a turbomachinery rotor for a cabin air compressor.

Cabin air compressors are used in environmental control systems in aircraft to condition air for delivery to an aircraft cabin. Conditioned air is air at a temperature, pressure, and humidity desirable for aircraft passenger comfort and safety. At or near ground level, the ambient air temperature and humidity is often sufficiently high that the air must be cooled as part of the conditioning process before being delivered to the aircraft cabin. At flight altitude, ambient air is often far cooler than desired, but at such a low pressure that it must be compressed to an acceptable pressure as part of the conditioning process. Compressing ambient air at flight altitude heats the resulting pressurized air sufficiently that it must be cooled, even if the ambient air temperature is very low. Thus, under most conditions, heat must be removed from the air by the air cycle machine before the air is delivered to the aircraft cabin.

A cabin air compressor can be used to compress air for use in an environmental control system. The cabin air compressor includes a motor to drive a compressor section that in turn compresses air flowing through the cabin air compressor. This compressor section includes a rotor, which transfers rotational energy from the motor to a fluid. The rotor is surrounded by a rotor shroud which improves rotor efficiency and protects the surrounding components in case of rotor failure. Shafts are mounted on a tie rod and extend between and configured to rotate with rotating components, such as the motor and rotor.

SUMMARY

A rotating shaft for a rotary machine includes a first shaft portion centered on a central axis and a variable lattice structure in an interior of the rotating shaft. The variable lattice structure includes a first region of the rotating shaft having a first lattice structure and a second region of the rotating shaft having a second lattice structure. The second lattice structure of the second region is denser than the first lattice structure of the first region. The second region is a deflection region or a stress region of the rotating shaft.

A rotary machine includes a tie rod extending through the rotary machine and a rotating shaft mounted on the tie rod. The rotating shaft includes a first shaft portion centered on a central axis and a variable lattice structure in an interior of the rotating shaft. The variable lattice structure includes a first region of the rotating shaft having a first lattice structure and a second region of the rotating shaft having a second lattice structure. The second lattice structure of the second region is denser than the first lattice structure of the first region. The second region is a deflection region or a stress region of the rotating shaft.

DETAILED DESCRIPTION

Figure 1:
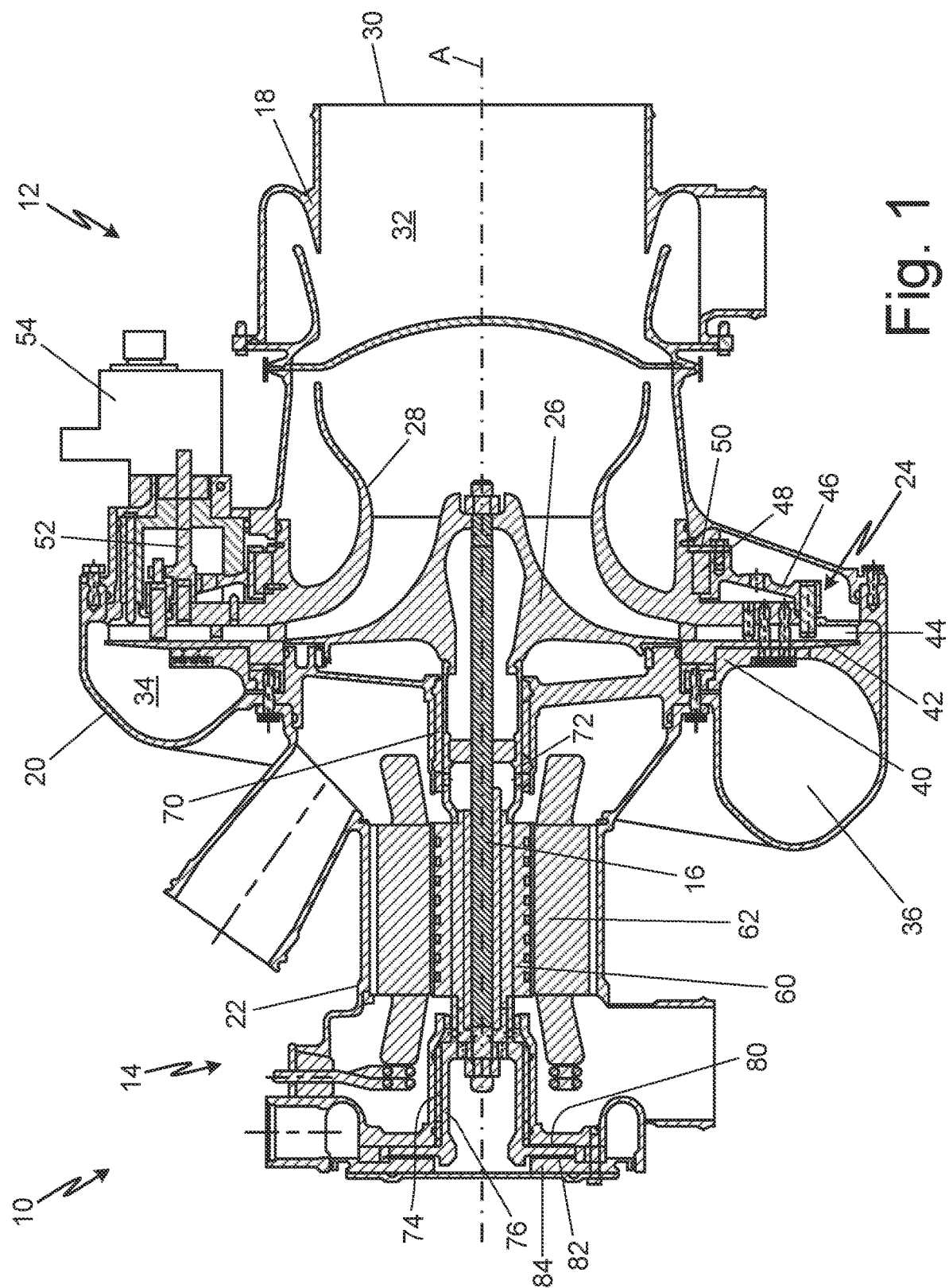
FIG. 1 is cross-sectional view of a cabin air compressor.

FIG. 1 is a cross-sectional view of cabin air compressor 10. Cabin air compressor 10 includes compressor section 12, motor section 14, tie rod 16, compressor inlet housing 18, compressor outlet housing 20, motor housing 22, variable diffuser 24, rotor 26, and rotor shroud 28. Compressor inlet housing 18 includes inlet 30 and inlet duct 32. Compressor outlet housing 20 includes outlet duct 34 and outlet 36. Variable diffuser 16 includes backing plate 40, inboard plate 42, diffuser vanes 44, drive ring 46, drive ring bearing 48, backup ring 50, pinion 52, and variable diffuser actuator 54. Motor section 14 includes motor rotor 60 and motor stator 62. Cabin air compressor 10 further includes first journal bearing 70, first rotating shaft 72, second journal bearing 74, second rotating shaft 76, first thrust bearing 80, second thrust bearing 82, and thrust plate 84. FIG. 1 also shows axis A.

Cabin air compressor 10 includes compressor section 12 and motor section 14 mounted on tie rod 16. Tie rod 16 is configured to rotate about axis A. Compressor section 12 includes compressor inlet housing 18 and compressor outlet housing 20 that are connected to one another. Motor section 14 includes motor housing 22, which is connected to compressor outlet housing 20. Variable diffuser 24 is positioned between compressor inlet housing 18 and compressor outlet housing 20. Rotor 26 is positioned between compressor inlet housing 18 and compressor outlet housing 20. Rotor 26 is mounted on tie rod 16, which rotatably connects rotor 26 and motor section 14. Rotor shroud 28 is positioned radially outward from and partially surrounds compressor rotor 26.

Compressor inlet housing 18 includes inlet 30 and inlet duct 32. Inlet 30 is positioned at a first end of compressor inlet housing 18. Inlet duct 32 extends from inlet 30 through compressor inlet housing 18 to rotor 26. Compressor outlet housing 20 includes outlet duct 34 and outlet 36. Outlet duct 34 extends through compressor outlet housing 20 from rotor 26 to outlet 36.

Variable diffuser 16 includes backing plate 40, inboard plate 42, diffuser vanes 44, drive ring 46, drive ring bearing 48, pinion 50, backup ring 52, and variable diffuser actuator 54. Backing plate 40 abuts compressor outlet housing 20 on a first side and inboard plate 42 on a second side. Inboard plate 42 abuts backing plate 40 on a first side and diffuser vanes 44 on a second side. Diffuser vanes 44 abut inboard plate 42 on a first side and rotor shroud 28 on a second side. Diffuser vanes 44 are configured to direct the compressed air from rotor 26 into outlet duct 34. Drive ring 46 is positioned radially outward from rotor shroud 28, and drive ring bearing 48 is positioned between driver ring 46 and rotor shroud 28. Drive ring 46 abuts rotor shroud 28 on a first side and backup ring 50 on a second side. Backup ring 50 is positioned radially outward of rotor shroud 28. Pinion 52 is connected to variable diffuser actuator 54 and is coupled to drive ring 46. Pinion 52 permits control of variable diffuser 16. Drive ring 46 is coupled to diffuser vanes 44 with pins, and as drive ring 46 is rotated it will drag diffuser vanes 44 and cause them to rotate.

Motor section 14 includes motor housing 22, motor rotor 60, and motor stator 62. Motor housing 22 surrounds motor rotor 60 and motor stator 62. Motor rotor 60 is disposed within motor stator 62 and is configured to rotate about axis A. Motor rotor 60 is mounted to tie rod 16 to drive rotation of tie rod 16.

Motor rotor 60 of motor section 14 drives rotation of shafts in cabin air compressor 10, which in turn rotates rotor 26. The rotation of rotor 26 draws air into inlet 30 of compressor inlet housing 18. The air flows through inlet duct 32 to rotor 26 and will be compressed by rotor 26. The compressed air is then routed through variable diffuser 16 and into outlet duct 34 of compressor outlet housing 20. The air then exits cabin air compressor 10 through outlet 36 of compressor outlet housing 20 and can be routed to another component of an environmental control system, such as an air cycle machine.

Cabin air compressor 10 further includes first journal bearing 70, first rotating shaft 72, second journal bearing 74, and second rotating shaft 76. First journal bearing 70 is positioned in compressor section 12 and is supported by compressor outlet housing 20. First rotating shaft 72 extends between and rotates with rotor 26 and motor rotor 60. Motor rotor 60 drives rotation of rotor 26 with first rotating shaft 72. A radially outer surface of first rotating shaft 72 abuts a radially inner surface of first journal bearing 70. Second journal bearing 74 is positioned in motor section 14 and is supported by motor housing 22. Second rotating shaft 76 extends from and rotates with motor rotor 60. A radially outer surface of second rotating shaft 76 abuts a radially inner surface of second journal bearing 74.

Cabin air compressor 10 further includes first thrust bearing 80, second thrust bearing 82, and thrust plate 84. Thrust plate 84 is bolted to motor housing 22 at a second end of motor housing 22. First thrust bearing 80 is positioned in motor section 14 between a disk portion of second rotating shaft 76 and motor housing 22. Second thrust bearing 82 is positioned in motor section 14 between the disk portion of second rotating shaft 76 and thrust plate 84. As second rotating shaft 76 rotates, the disk portion of second rotating shaft 76 will rotate against first thrust bearing 80 and second thrust bearing 82.

Figure 2A:
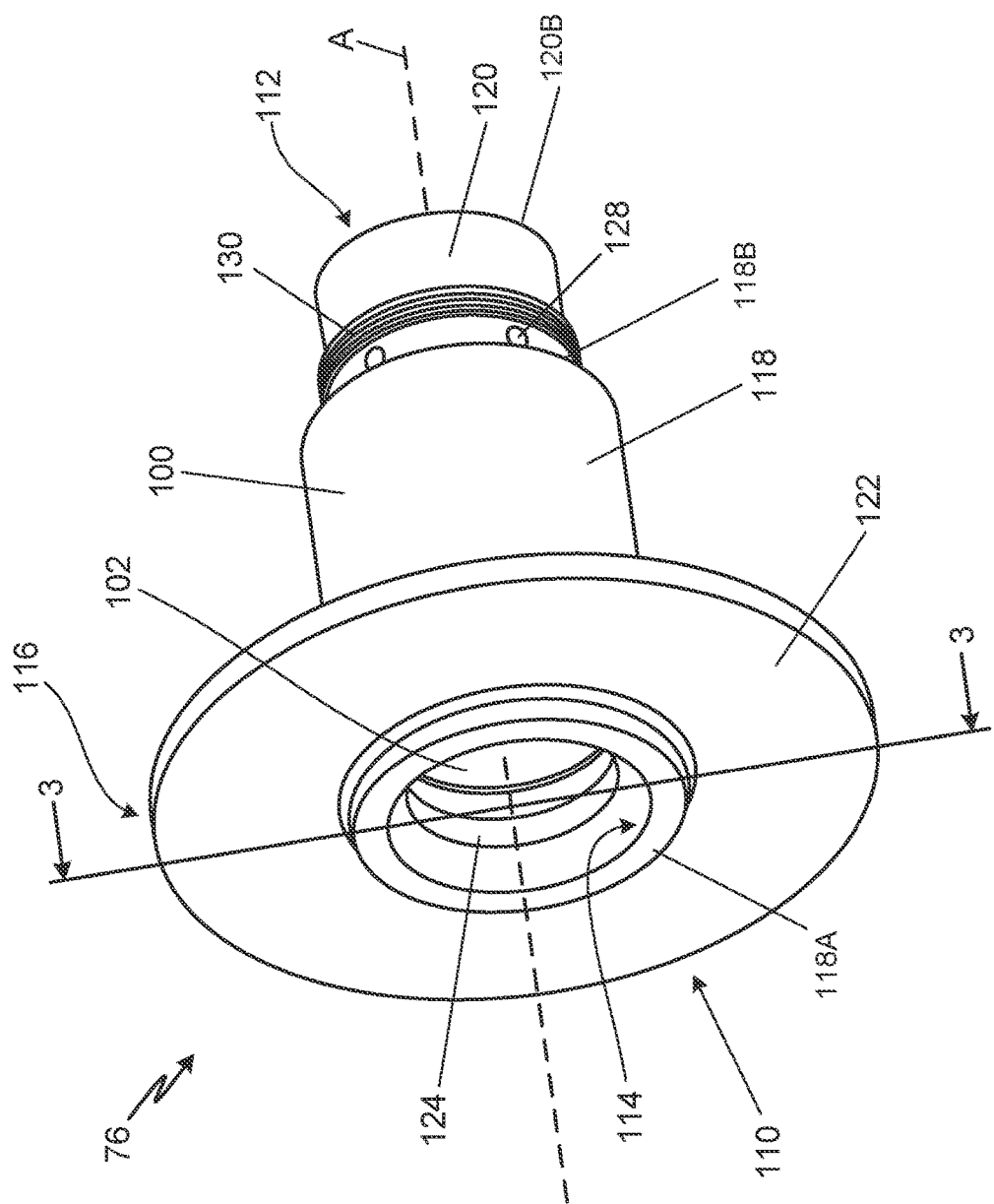
FIG. 2A is a perspective view of a first side of a rotating shaft.
Figure 2B:
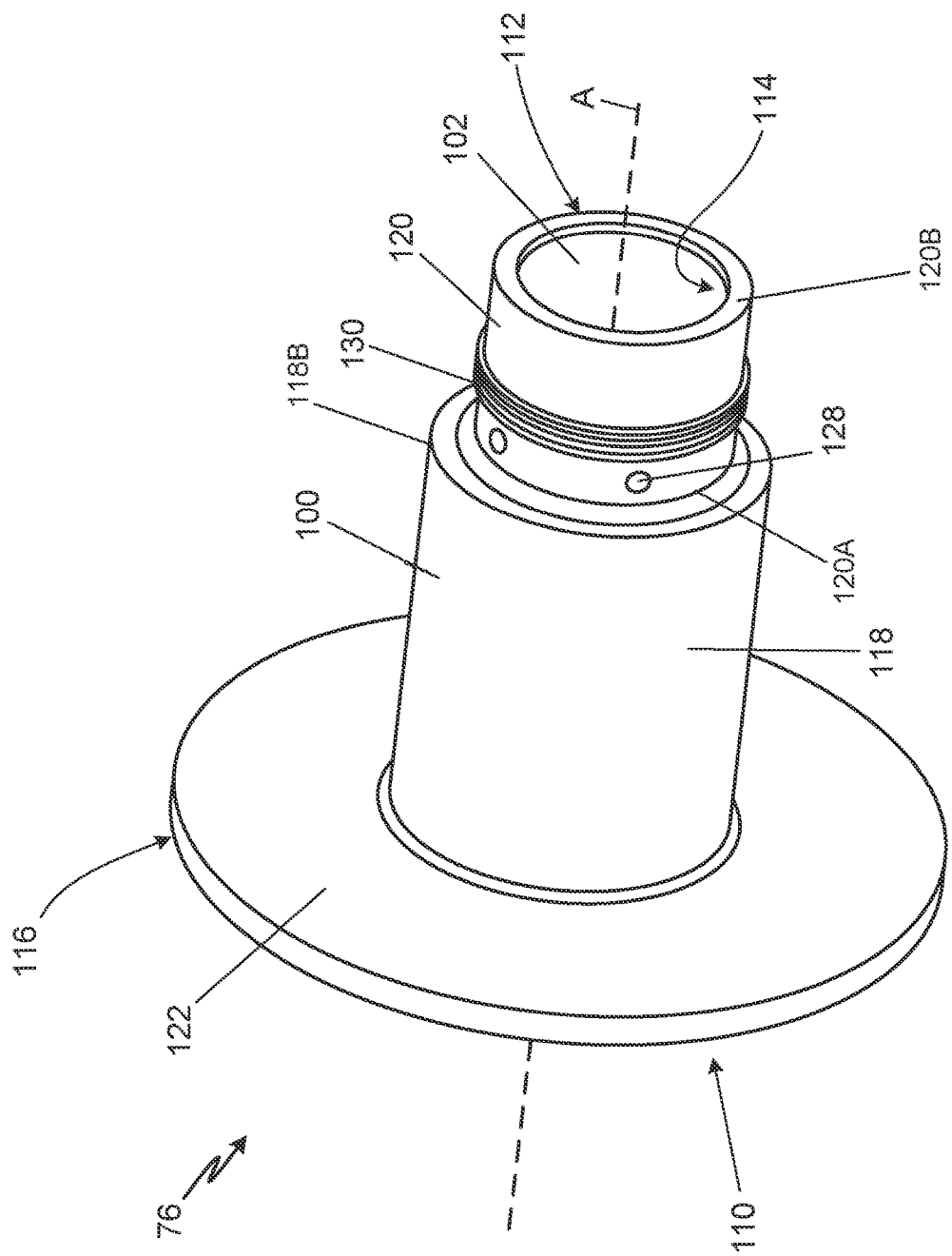
FIG. 2B is a perspective view of a second side of the rotating shaft.
Figure 3:
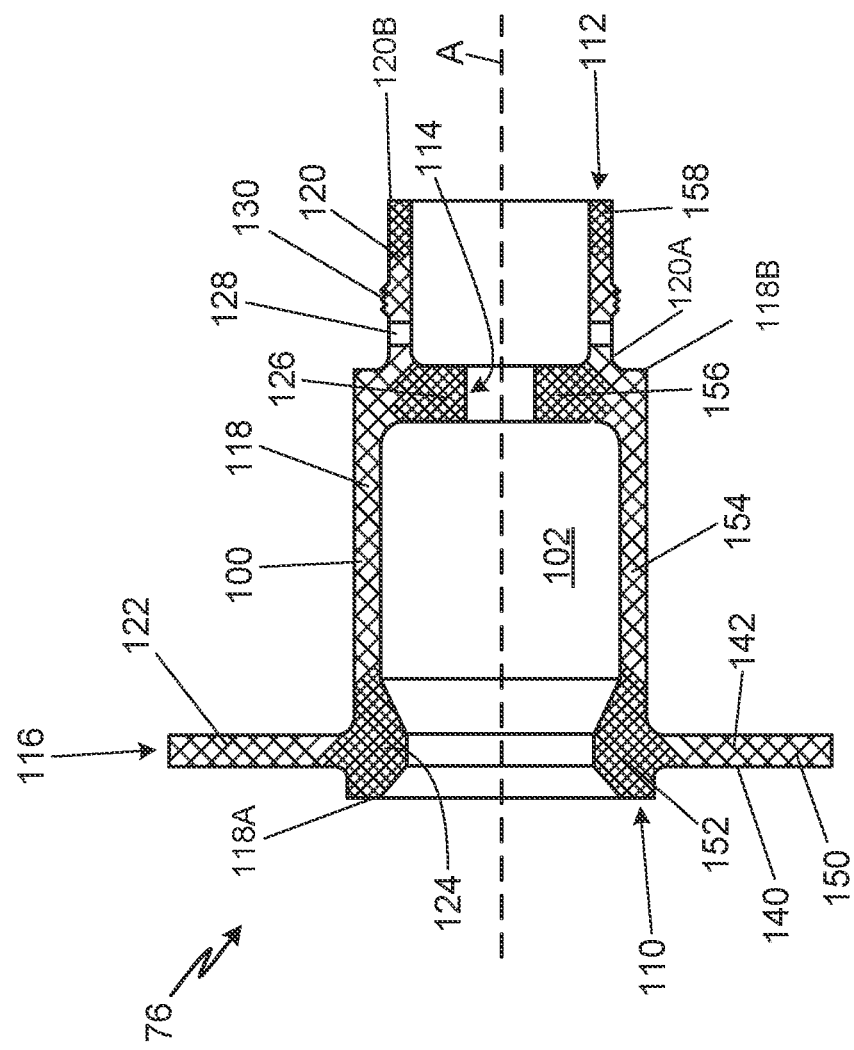
FIG. 3 is a cross-sectional view of the rotating shaft taken along section line 3-3 of FIG. 2A.

FIG. 2A is a perspective view of a first side of rotating shaft 76. FIG. 2B is a perspective view of a second side of rotating shaft 76. FIG. 3 is a cross-sectional view of rotating shaft 76 taken along section line 3-3 of FIG. 2A. FIGS. 2A-3 will be discussed together. Rotating shaft 76 includes body 100 and bore 102. Body 100 includes first side 110, second side 112, radially inner end 114, radially outer end 116, first shaft portion 118 with first side 118A and second side 118B, second shaft portion 120 with first side 120A and second side 120B, disk portion 122, rib 124 (shown in FIGS. 2A and 3), flange 126 (shown in FIG. 3), first holes 128, and labyrinth seal 130. As shown in FIG. 3, body 100 further includes exterior surface 140 and lattice structure 142, which includes first region 150, second region 152, third region 154, fourth region 156, and fifth region 158. FIGS. 2A-3 further show central axis A.

Rotating shaft 76 includes body 100 with bore 102 extending through a center of body 100. Body 100 has first side 110 and second side 112 opposite of first side 110. Body 100 also has radially inner end 114 and radially outer end 116 opposite of radially inner end 114. Radially inner end 114 of body 100 defines bore 102 extending through body 100 of rotating shaft 76.

Body 100 includes first shaft portion 118 extending from first end 110 to second shaft portion 120. First shaft portion 118 is a cylindrical shaped portion that extends along central axis A. Second shaft portion 120 extends from first shaft portion 118 to second end 112 of body 100. Second shaft portion 120 is a cylindrical shaped portion that extends along central axis A. Second shaft portion 120 has a smaller inner diameter and a smaller outer diameter than an inner diameter and an outer diameter of first shaft portion 118, respectively. Disk portion 122 extends radially outwards from first side 118A of first shaft portion 118 to radially outer end 116. Disk portion 122 is a generally flat disk shaped portion of body 100.

Rib 124 is adjacent to first side 118A of first shaft portion 118 and extends radially inwards from first shaft portion 118. Flange 126 is adjacent to second side 118B of first shaft portion 118 and extends radially inwards form first shaft portion 118. Flange 126 is configured to mount rotating shaft 76 on a tie rod. First holes 128 include a plurality of holes positioned around second shaft portion 120 near first side 120A of second shaft portion 120. Labyrinth seal 130 is integrally formed on a radially outer end of second shaft portion 120 between first side 120A and second side 120B of second shaft portion 120.

Body 100 further includes exterior surface 140 that surrounds lattice structure 142 in an interior of body 100. Exterior surface 140 is a solid, continuous surface. Lattice structure 142 is a varying lattice structure. Lattice structure 142 has regions with varying densities. As shown in FIG. 3, lattice structure 142 has first region 150, second region 152, third region 154, fourth region 156, and fifth region 158. Lattice structure 142 may vary gradually or abruptly between regions. Lattice structure 142 includes members arranged in a 3D crisscrossing pattern with voids between the members. As shown in FIG. 3, lattice structure 142 varies in density by having a varying distribution of the members and voids of lattice structure 142. In alternate embodiments, lattice structure 142 can vary in density by varying the thickness of the members, by having varying geometrical configurations, and/or by varying fillet radii on joints between the members.

First region 150 is a region of lattice structure 142 in disk portion 122 of body 100. Second region 152 is a region of lattice structure 142 in first side 118A of first shaft portion 118 and rib 124 and extending into disk portion 122. Third region 154 is a region of lattice structure 142 in first shaft portion 118 and second shaft portion 120. Fourth region 156 is a region of lattice structure 142 in flange 126 and extending into first shaft portion 118. Fifth region 158 is a region of lattice structure 142 in second side 120B of second shaft portion 120.

In the embodiment shown in FIG. 3, second region 152, fourth region 156, and fifth region 158 have a greater density than first region 150 and third region 154. Rotating shaft 76 is additively manufactured, allowing lattice structure 142 to be manufactured with different densities in different areas of rotating shaft 76. Any suitable additive manufacturing process (also known as a 3D printing process) can be used to manufacture rotating shaft 76, including, for example, direct metal laser sintering, electron beam freeform fabrication, electron-beam melting, selective laser melting, or selective laser sintering. Rotating shaft 76 can be made out of any material that can be used in an additive manufacturing process, including any of stainless steel, corrosion-resistant steel, nickel-chromium alloy, aluminum, titanium, synthetic fiber, fiberglass, composites, and combinations thereof.

Traditional rotating shafts for rotary machines have solid cross-sections and are manufactured by forging and/or subtractive manufacturing processes, such as hogout. Additively manufacturing rotating shaft 76 allows lattice structure 142 to be used in rotating shaft 76. Using lattice structure 142 in rotating shaft 76 allows rotating shaft 76 to have a reduced weight compared to traditional rotor shrouds, as there are voids between the lattice structure. At the same time, rotating shaft 76 will have an equivalent strength as traditional rotor shrouds due to the increased strength of lattice structure 142. Lattice structure 142 also allows rotating shaft 76 to have an optimized critical speed. Lattice structure 142 raises the stiffness of rotating shaft 76, which allows for the critical speed of rotating shaft 76 to be raised.

Further, the density of lattice structure 142 is varied to optimize mechanical properties of rotating shaft 76 locally and generally. Mechanical properties of rotating shaft 76, such as stress, strain, and stiffness, can be optimized to improve the performance of rotating shaft 76 by reducing stress in high stress regions of rotating shaft 76 and reducing strain and increasing stiffness in deflection regions of rotating shaft 76. Reducing stress and strain in local regions of rotating shaft 76 can also reduce stress and strain in rotating shaft 76 generally. Reducing the stresses in high stress regions can reduce the failure rate of components in cabin air compressor 10 (for example first thrust bearing 80 and second thrust bearing 82) and, thus, the failure rate of cabin air compressor 10. Reduced failure rates result in reduced down time, reduced repairs, and reduced costs. Reducing the strain and increasing the stiffness in deflection regions can reduce the tolerances in cabin air compressor 10, such as reducing tolerances between rotors and components surrounding the rotors in cabin air compressor 10. Reducing the tolerances can increase the compression efficiency of cabin air compressor 10.

Figure 4:
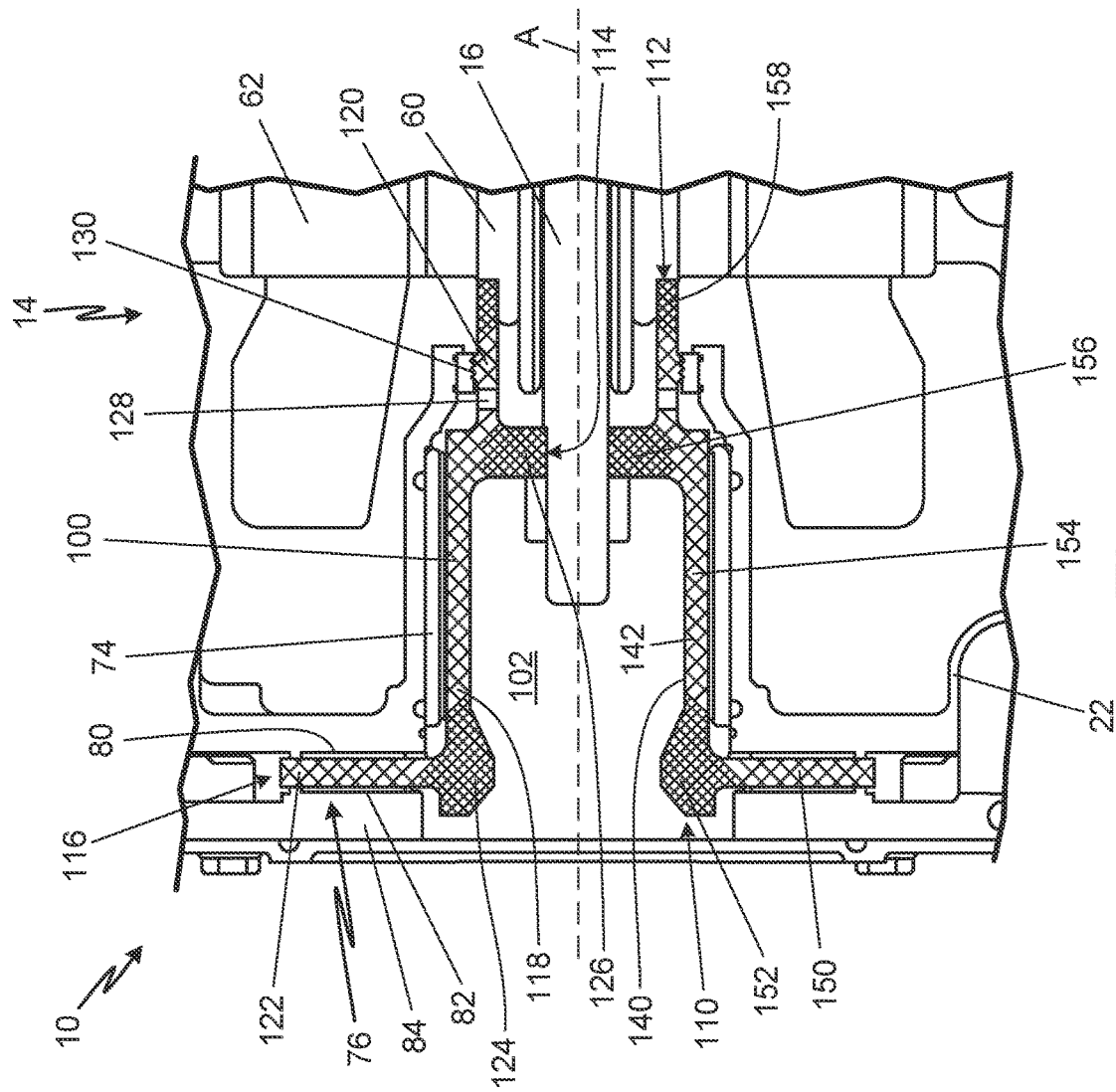
FIG. 4 is a cross-sectional view of the rotating shaft positioned in the cabin air compressor.

FIG. 4 is a cross-sectional view of rotating shaft 76 positioned in cabin air compressor 10. Cabin air compressor 10 includes motor section 14, tie rod 16, and motor housing 22. Motor section 14 includes motor rotor 60 and motor stator 62. Cabin air compressor 10 further includes journal bearing 74, rotating shaft 76, first thrust bearing 80, second thrust bearing 82, and thrust plate 84. Rotating shaft 76 includes body 100 and bore 102. Body 100 includes first side 110, second side 112, radially inner end 114, radially outer end 116, first shaft portion 118, second shaft portion 120, disk portion 122, rib 124, flange 126, first holes 128, and labyrinth seal 130. As shown in FIG. 3, body 100 further includes exterior surface 140 and lattice structure 142, which includes first region 150, second region 152, third region 154, fourth region 156, and fifth region 158. FIG. 4 also shows axis A.

Cabin air compressor 10 has the structure and design as described above in reference to FIG. 1. Rotating shaft 76 has the structure and design as described above in reference to FIGS. 2A-3. Rotating shaft 76 is mounted on tie rod 16. Flange 126 mounts rotating shaft 76 on tie rod 16. A radially outer surface of first shaft portion 118 abuts and rotates against journal bearing 74. Second side 120B of second shaft portion 120 abuts and is mounted to motor rotor 60, causing rotating shaft 76 to rotate with motor rotor 60. Labyrinth seal 130 on second shaft portion 120 forms a seal against motor housing 22. As rotating shaft 76 rotates with motor rotor 60 and tie rod 16, labyrinth seal 130 will rotate against motor housing 22, which is a stationary component of cabin air compressor 10. Disk portion 122 of rotating shaft 76 is positioned between and rotates against first thrust bearing 80 and second thrust bearing 82.

Rotating shaft 76 has second region 152 of lattice structure 142 in first side 118A of first shaft portion 118 and rib 124 and extending into disk portion 122. Second region 152 is a deflection region of rotating shaft 76, which is a region of body 100 of rotating shaft 76 that is subject to deflection during operation of rotating shaft 76. As rotating shaft 76 rotates with tie rod 16 and motor rotor 60, second region 152 will be subject to deflections due to the rotation of rotating shaft 76. Second region 152 of lattice structure 142 is an area of increased density that aids in deflection management during operation of rotating shaft 76 to reduce and prevent deflection of rotating shaft 76. By reducing and preventing deflection during operation of rotating shaft 76, the efficiency of cabin air compressor 10 can be increased.

There are gaps between rotor 26 and other components of cabin air compressor 10 to prevent contact between rotor 26 and other components of cabin air compressor 10. Contact between rotor 26 and other components of cabin air compressor 10 may damage the components and cause failure of cabin air compressor 10. The gaps between rotor 26 and other components of cabin air compressor 10 have to account for deflections that rotor 26 and other rotating components, such as rotating shaft 76, can be subjected to during operation of cabin air compressor 10. As all of the rotating components in cabin air compressor 10 rotate with tie rod 16, deflections in any rotating component can cause deflections in rotor 26. Thus, the more deformation that rotating shaft 76 is subjected to during operation of cabin air compressor 10, the larger the gaps need to be to ensure component safety. However, air can leak from cabin air compressor 10 through the gaps, which leads to inefficiencies in cabin air compressor 10. Thus, it is desirable to minimize the gaps between rotor 26 and other components of cabin air compressor 10. Identifying deflection regions of rotating shaft 76 and increasing the density of lattice structure 142 in the deflection regions (for example, second region 152) reduces and prevents the deflections and strain that rotating shaft 76 is subjected to during operation of cabin air compressor 10 by increasing the stiffness in these areas. This reduced deflection and strain and increased stiffness means that the parts deform less when in operation. If rotating shaft 76 undergoes less deflection, the gaps between rotor 26 and other components of cabin air compressor 10 can be reduced. Reducing the gap increases the efficiency of cabin air compressor 10.

Increasing the density of lattice structure 142 in deflection regions also reduces deflections of thrust plate 84. As rotating shaft 76 rotates with tie rod 16 in cabin air compressor 10, disk portion 122 of rotating shaft 76 rotates against first thrust bearing 80 and second thrust bearing 82. If rotating shaft 76 defects, those deflections can be translated to thrust plate 84. Deflections in thrust plate 84 can cause failure of first thrust bearing 80 and/or second thrust bearing 82 and, thus, failure of cabin air compressor 10. Reducing the deflection and strain and increasing the stiffness of rotating shaft 76 can prevent deflections in thrust plate 84.

Rotating shaft 76 has fourth region 156 of lattice structure 142 in flange 126 and extending into first shaft portion 118. Fourth region 156 is a stress region of rotating shaft 76, which is a region of body 100 of rotating shaft 76 that is subject to high stress during operation of rotating shaft 76. The high stress in stress regions of rotating shaft 76, such as fourth region 156, is a higher stress than stresses present in other regions of rotating shaft 76. As rotating shaft 76 rotates with tie rod 16, flange 126 will rotate with first rotating shaft 76 and tie rod 16 and subject fourth region 156 to high stress. Fourth region 156 of lattice structure 142 is an area of increased density that aids in stress reduction during operation of rotating shaft 76 to reduce the stress in fourth region 156 of rotating shaft 76. Stress reduction at critical points of rotating shaft 76 leads to increased longevity of rotating shaft 76.

Rotating shaft 76 has fifth region 158 of lattice structure 142 in a second side of second shaft portion 120. Fifth region 158 is a stress region of rotating shaft 76, which is a region of body 100 of rotating shaft 76 that is subject to high stress during operation of rotating shaft 76. The second side of second shaft portion 120 abuts and is mounted to motor rotor 60. The high stress in stress regions of rotating shaft 76, such as fifth region 158, is a higher stress than stresses present in other regions of rotating shaft 76. As rotating shaft 76 rotates with tie rod 16 and motor rotor 60, fifth region 158 in the second side of second shaft portion 120 will be subjected to high stress as it rotates with motor rotor 60. Fifth region 158 of lattice structure 142 is an area of increased density that aids in stress reduction during operation of rotating shaft 76 to reduce the stress in fifth region 158 of rotating shaft 76. Stress reduction at critical points of rotating shaft 76 leads to increased longevity of rotating shaft 76.

Reducing stress in stress regions of rotating shaft 76 will also improve the longevity of rotating shaft 76. Reducing the stresses at stress regions can reduce the failure rate of rotating shaft 76 as well as the failure rate of cabin air compressor 10 overall. During operation, these failures can be damage components surrounding rotating shaft 76, such as motor housing 22 or thrust plate 84, as these components are required to contain the energy of the failure for safety of the aircraft and its passengers. Reduced failure rates result in reduced down time, reduced repairs, and reduced costs.

Rotating shaft 76 is one example of a rotor in which variable lattice structure 142 can be used. In alternate embodiments, variable lattice structure 142 can be used in any suitable rotating shaft having any design. Further, cabin air compressor 10 is one example of a turbomachinery or rotary machine in which rotating shaft 76 or any other rotating shaft with variable lattice structure 142 can be used. In alternate embodiments, rotating shaft 76 or any other rotating shaft with variable lattice structure 142 can be used in an air cycle machine or any other rotary machine.

Figure 5:
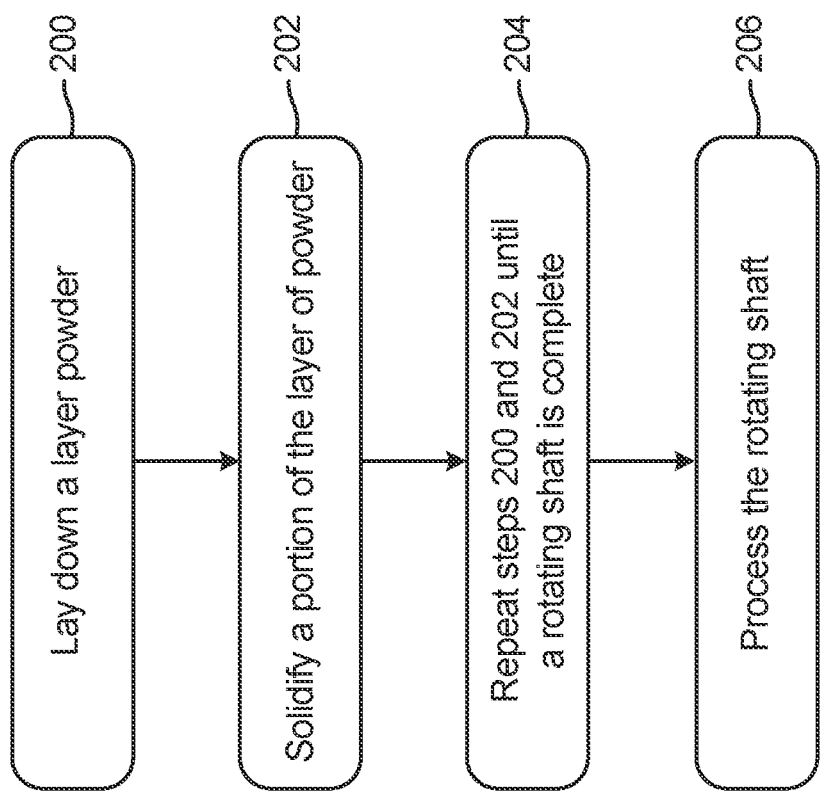
FIG. 5 is a flowchart showing a method of manufacturing the rotating shaft.

FIG. 5 is a flowchart showing a method of manufacturing the shaft. FIG. 5 shows steps 200-206. Step 200 includes laying down a layer of powder. Step 202 solidifying a portion of the layer of powder. Step 204 includes repeating steps 200 and 202 until rotating shaft 76 is completed. Step 206 includes processing rotating shaft 76.

Rotating shaft 76 can be manufactured using an additive manufacturing process. Additive manufacturing involves manufacturing rotating shaft 76 layer by layer. Additive manufacturing processes allow complex internal and external shapes and geometries to be manufactured that are not feasible or possible with traditional manufacturing. A typical additive manufacturing process involves using a computer to create a three-dimensional representation of rotating shaft 76. The three-dimensional representation will be converted into instructions which divide rotating shaft 76 into many individual layers. These instructions are then sent to an additive manufacturing device. This additive manufacturing device will print each layer, in order, and one at a time until all layers have been printed. Any additive manufacturing process can be used, including direct metal laser sintering, electron beam freeform fabrication, electron-beam melting, selective laser melting, selective laser sintering, or other equivalents that are known in the art.

Step 200 includes laying down a layer of powder. The powder can be made of a material selected from the group consisting of stainless steel, corrosion-resistant steel, nickel-chromium alloy, aluminum, titanium, synthetic fiber, fiberglass, composites, and combinations thereof. This powder may be laid down by a roller, pressurized gas, or other equivalents that are known in the art. This powder may have any grain size, wherein the grain size of the powder affects the unprocessed surface properties of rotating shaft 76.

Step 202 includes solidifying a portion of the layer of powder. A portion of the layer of powder can be solidified by applying energy to layer of powder. Any energy source can be used, including laser beam, electron beams, or other equivalents that are known in the art. The application of this energy will solidify the powder in a specific configuration. The specific configuration of solidified metal will be entirely dependent on which layer the process is currently at. This specific configuration will be in a specific shape and distribution so that when combined with the other layers, it forms rotating shaft 76.

Step 204 includes repeating steps 200 and 202 until rotating shaft 76 is completed. These two steps together lead to rotating shaft 76 being built layer by layer to completion. The specific configuration of step 202 consists of exterior surface 140, which is continuous and solid, and lattice structure 142, which has a varying density. The density of lattice structure 142 can be locally optimized to reduce stress or strain in specific regions. Reducing the stresses at high stress regions can reduce the failure rate of rotating shaft 76 and thus the failure rate of cabin air compressor 10. Reduced failure rates result in reduced down time, reduced repairs, and reduced costs. Reduced strain, and thus reduced deflection, at deflection regions means that the parts deform less when in operation. If rotating shaft 76 undergo less deflection, the tolerances between components of cabin air compressor 10 can be reduced. Reducing tolerances between components increases the efficiency of cabin air compressor 10.

Step 206 includes processing rotating shaft 76. Step 206 is an optional step.

Processing rotating shaft 76 can include post processing steps, such as smoothing of exterior surface 140 of rotating shaft 76 or removal of powder from an interior of rotating shaft 76. Since an additive manufacturing process is used, exterior surface 140 of rotating shaft 76 may be rougher than desired. Through sanding, brushing, buffing, grinding, and combinations thereof, exterior surface 140 of rotating shaft 76 may be made smoother. Removal of the powder from an interior of rotating shaft 76 can involve the process of removing the unsolidified powder between lattice structure 142 through high pressure gas, mechanical movements, or other methods know in the art.

DISCUSSION OF POSSIBLE EMBODIMENTS

The following are non-exclusive descriptions of possible embodiments of the present invention.

A rotating shaft for a rotary machine includes a first shaft portion centered on a central axis and a variable lattice structure in an interior of the rotating shaft. The variable lattice structure includes a first region of the rotating shaft having a first lattice structure and a second region of the rotating shaft having a second lattice structure. The second lattice structure of the second region is denser than the first lattice structure of the first region. The second region is a deflection region or a stress region of the rotating shaft.

The rotating shaft of the preceding paragraph can optionally include, additionally and/or alternatively, any one or more of the following features, configurations and/or additional components:

The rotating shaft has a continuous exterior solid surface surrounding the variable lattice structure.

The stress region of the rotating shaft is a region of the rotating shaft that is subject to higher stress than other regions of the rotating shaft.

The stress region of the rotating shaft is a flange extending axially inward from the first shaft portion.

The rotating shaft further includes a second shaft portion extending away from a second side of the first shaft portion.

The stress region of the rotating shaft is a region in a second side of the second shaft portion.

The deflection region of the rotating shaft is a region of the rotating shaft that is subject to deflections.

The deflection region of the rotating shaft is a rib extending axially inward from the first shaft portion.

The rotating shaft is made of a material selected from the group consisting of stainless steel, corrosion-resistant steel, nickel-chromium alloy, aluminum, titanium, synthetic fiber, fiberglass, composites, and combinations thereof.

The rotating shaft further includes a second shaft portion extending away from a second side of the first shaft portion, and a disk portion extending radially outward from a first side of the first shaft portion.

A rotary machine includes a tie rod extending through the rotary machine and a rotating shaft mounted on the tie rod. The rotating shaft includes a first shaft portion centered on a central axis and a variable lattice structure in an interior of the rotating shaft. The variable lattice structure includes a first region of the rotating shaft having a first lattice structure and a second region of the rotating shaft having a second lattice structure. The second lattice structure of the second region is denser than the first lattice structure of the first region. The second region is a deflection region or a stress region of the rotating shaft.

The rotary machine of the preceding paragraph can optionally include, additionally and/or alternatively, any one or more of the following features, configurations and/or additional components:

The rotating shaft has a continuous exterior solid surface surrounding the variable lattice structure.

The stress region of the rotating shaft is a region of the rotating shaft that is subject to higher stress than other regions of the rotating shaft.

The stress region of the rotating shaft is a flange extending axially inward from the first shaft portion that abuts the tie rod of the rotary machine.

The rotating shaft further includes a second shaft portion extending away from a second side of the first shaft portion.

The stress region of the rotating shaft is a region in a second side of the second shaft portion that abuts a motor rotor of the rotary machine.

The deflection region of the rotating shaft is a region of the rotating shaft that is subject to deflections.

The deflection region of the rotating shaft is a rib extending axially inward from the first shaft portion.

The rotating shaft is made of a material selected from the group consisting of stainless steel, corrosion-resistant steel, nickel-chromium alloy, aluminum, titanium, synthetic fiber, fiberglass, composites, and combinations thereof.

The rotating shaft further includes a second shaft portion extending away from a second side of the first shaft portion, and a disk portion extending radially outward from a first side of the first shaft portion.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A rotating shaft for a rotary machine comprising:
   a first shaft portion centered on a central axis;
   a rib adjacent to a first side of the first shaft portion and extending radially inward from the first shaft portion;
   a flange adjacent to a second side of the first shaft portion and extending radially inward from the first shaft portion;
   a second shaft portion extending away from the second side of the first shaft portion and including a second side located axially away from the first shaft portion; and
   a variable lattice structure in an interior of the rotating shaft, the variable lattice structure comprises:
      a first region of the rotating shaft having a first lattice structure; and
      a second region of the rotating shaft having a second lattice structure;
      wherein the second lattice structure of the second region is denser than the first lattice structure of the first region; and
      wherein the second region is a deflection region or a stress region of the rib, the flange, or a region in the second side of the second shaft portion of the rotating shaft.

2. The rotating shaft of claim 1, wherein the rotating shaft has a continuous exterior solid surface surrounding the variable lattice structure.

3. The rotating shaft of claim 1, wherein the stress region of the rotating shaft is a region of the rotating shaft that is subject to higher stress than other regions of the rotating shaft.

4. The rotating shaft of claim 3, wherein the stress region of the rotating shaft is the flange extending radially inward from the first shaft portion.

5. The rotating shaft of claim 3, wherein the stress region of the rotating shaft is the region in a second side of the second shaft portion.

6. The rotating shaft of claim 1, wherein the deflection region of the rotating shaft is a region of the rotating shaft that is subject to deflections.

7. The rotating shaft of claim 6, wherein the deflection region of the rotating shaft is the rib extending radially inward from the first shaft portion.

8. The rotating shaft of claim 1, wherein the rotating shaft is made of a material selected from the group consisting of stainless steel, corrosion-resistant steel, nickel-chromium alloy, aluminum, titanium, synthetic fiber, fiberglass, composites, and combinations thereof.

9. The rotating shaft of claim 1, and further comprising:
   a disk portion extending radially outward from a first side of the first shaft portion.

10. A rotary machine comprising:
    a tie rod extending through the rotary machine; and
    a rotating shaft mounted on the tie rod, wherein the rotating shaft comprises:
       a first shaft portion centered on a central axis; and
       a rib adjacent to a first side of the first shaft portion and extending radially inward from the first shaft portion;

a flange adjacent to a second side of the first shaft portion and extending radially inward from the first shaft portion;

a second shaft portion extending away from the second side of the first shaft portion and including a second side located axially away from the first shaft portion; and a variable lattice structure in an interior of the rotating shaft, the variable lattice structure comprises:

a first region of the rotating shaft having a first lattice structure; and a second region of the rotating shaft having a second lattice structure;

wherein the second lattice structure of the second region is denser than the first lattice structure of the first region; and wherein the second region is a deflection region or a stress region of the rib, the flange, or a region in the second side of the second shaft portion of the rotating shaft.

11. The rotary machine of claim 10, wherein the rotating shaft has a continuous exterior solid surface surrounding the variable lattice structure.

12. The rotary machine of claim 10, wherein the stress region of the rotating shaft is a region of the rotating shaft that is subject to higher stress than other regions of the rotating shaft.

13. The rotary machine of claim 12, wherein the stress region of the rotating shaft is the flange extending radially inward from the first shaft portion that abuts the tie rod of the rotary machine.

14. The rotary machine of claim 12, wherein the stress region of the rotating shaft is the region in a second side of the second shaft portion that abuts a motor rotor of the rotary machine.

15. The rotary machine of claim 10, wherein the deflection region of the rotating shaft is the region of the rotating shaft that is subject to deflections.

16. The rotary machine of claim 15, wherein the deflection region of the rotating shaft is the rib extending radially inward from the first shaft portion.

17. The rotary machine of claim 10, wherein the rotating shaft is made of a material selected from the group consisting of stainless steel, corrosion-resistant steel, nickel-chromium alloy, aluminum, titanium, synthetic fiber, fiberglass, composites, and combinations thereof.

18. The rotary machine of claim 10, wherein the rotating shaft further comprises:

a disk portion extending radially outward from a first side of the first shaft portion.

\* \* \* \* \*